United States Patent [19]

Stow

[11] 4,404,500
[45] Sep. 13, 1983

[54] PROJECTION TELEVISION APPARATUS

[75] Inventor: Richard G. Stow, West Wickham, England

[73] Assignee: U.S. Philips Corporation, New York, N.Y.

[21] Appl. No.: 270,667

[22] Filed: Jun. 4, 1981

[30] Foreign Application Priority Data

Jun. 10, 1980 [GB] United Kingdom ................ 8018880

[51] Int. Cl.³ ........................................... H01J 29/52
[52] U.S. Cl. ................................... 315/386; 315/381; 358/60; 358/220
[58] Field of Search ................... 315/381, 386; 358/60, 358/220

[56] References Cited

U.S. PATENT DOCUMENTS

| 3,090,889 | 5/1963 | Levinson | 315/386 |
| 3,399,324 | 8/1968 | Brown | 315/381 |
| 3,848,945 | 11/1974 | Holzrichter | 315/386 |
| 4,187,451 | 2/1980 | Boekhorst | 358/220 |
| 4,227,122 | 10/1980 | Fujisawa et al. | 358/60 |
| 4,297,619 | 10/1981 | Kiteley | 315/381 |

Primary Examiner—Theodore M. Blum
Attorney, Agent, or Firm—Jack Oisher; William J. Streeter; Laurence A. Wright

[57] ABSTRACT

In projection television apparatus in order to prevent burning of the phosphor screen of at least one of the television projection tubes a display is not produced should there be an interruption or substantial reduction in the deflection current through one of the line or field deflection coils. Each deflection coil is connected in series with sensing means for separately sensing the deflection current flowing therethrough. In the event of one of the currents through one of the deflection coils being interrupted or substantially reduced means responsive to said sensing means prevents picture information from being applied to the control grids of the projection tubes.

4 Claims, 2 Drawing Figures

PROJECTION TELEVISION APPARATUS

The invention relates to projection television apparatus having a plurality of projection television tubes each adapted to produce a display of a different colour for projection, each projection tube having a line deflection coil and a field deflection coil for deflecting an electron beam when generated in each projection tube in two orthogonal directions, the said line deflection coils being connected in parallel branches connected to a line output stage for providing line deflection current through said line deflection coils, the said field deflection coils being connected to a field output stage for providing field deflection current through said field deflection coils, and protection means for protecting a projection tube in the event of the cessation of or substantial reduction in the line deflection current through the line deflection coil corresponding to said projection tube.

BACKGROUND OF THE INVENTION

In such projection television apparatus it is essential to provide some form of protection for the projection tubes should the line deflection current through one of the line deflection coils cease or substantially reduce or such field deflection current through one of the field deflection coils cease or substantially reduce. In a previous arrangement where the line deflection coils were connected in parallel a single sensing means was provided to determine the magnitude of the total deflection current supplied by the line output stage such that a change in the line deflection current due to one of the line deflection coils becoming open circuit would be used to control the protection circuit. With such an arrangement the magnitude of the total deflection currents had to be measured and due allowance had to be made for any normal changes in each individual deflection current.

OBJECT OF THE INVENTION

It is an object of the invention to provide apparatus of the type described in the opening paragraph which may be more easily controlled and in which the failure condition more clearly distinguishes from the normal operative condition.

SUMMARY OF THE INVENTION

To this end the projection television apparatus according to the invention is characterized in that said protection means comprises sensing means connected in series with each line deflection coil for separately sensing the line deflection current therethrough and means responsive to said sensing means for preventing the electron beam from falling on the screen of the projection tubes upon the occurrence of the said event.

With such apparatus the field deflection coils could be connected in series and thus a single sensing means could be used to determine if an open circuit condition occurred in any of the field deflection coils. Where the field deflection coils are connected in parallel branches the projection television apparatus may be characterized in that the protection means additionally comprises further sensing means connected in series with each field deflection coils for separately sensing the field deflection current therethrough and means responsive to the further sensing means for preventing the electron beam from falling on the screen of the projection tubes in the event of the cessation of or a substantial reduction in the field deflection current through the field deflection coil corresponding to one projection tube.

The sensing means of the projection television apparatus may comprise a plurality of transformers the primary of each transformer being connected in series with a corresponding line deflection coil while the secondary is connected to an associated transistor such that the associated transistor conducts in the presence of a normal line deflection current but is non-conducting in the event of the cessation of or substantial reduction in the line deflection current through the corresponding line deflection coil, the said transistors being connected with a control stage such that in the event of one of said transistors being non-conducting said control stage prevents picture information from being applied to the control grids of the projection tubes.

Where the field deflection coils are connected in parallel branches the further sensing means may comprise a plurality of further transformers the primary of each further transformer being connected in series with a corresponding field deflection coil while the secondary is connected to an associated further transistor such that the associated transistor conducts in the presence of a normal field deflection current but is non-conducting in the event of the cessation of or substantial reduction in the field deflection current through the corresponding field deflection coil, the said further transistors being connected with said control stage such that in the event of one of said further transistors being non-conducting said control stage prevents picture information from being applied to the control grids of the projection tube.

BRIEF DESCRIPTION OF THE DRAWINGS

The above other features of the invention will be more readily understood from the following description with reference FIGS. 1 and 2 of the accompanying drawings which show the projection television apparatus according to the invention.

DETAILED DESCRIPTION OF THE PREFERRED EMBODIMENTS

Figure 1:
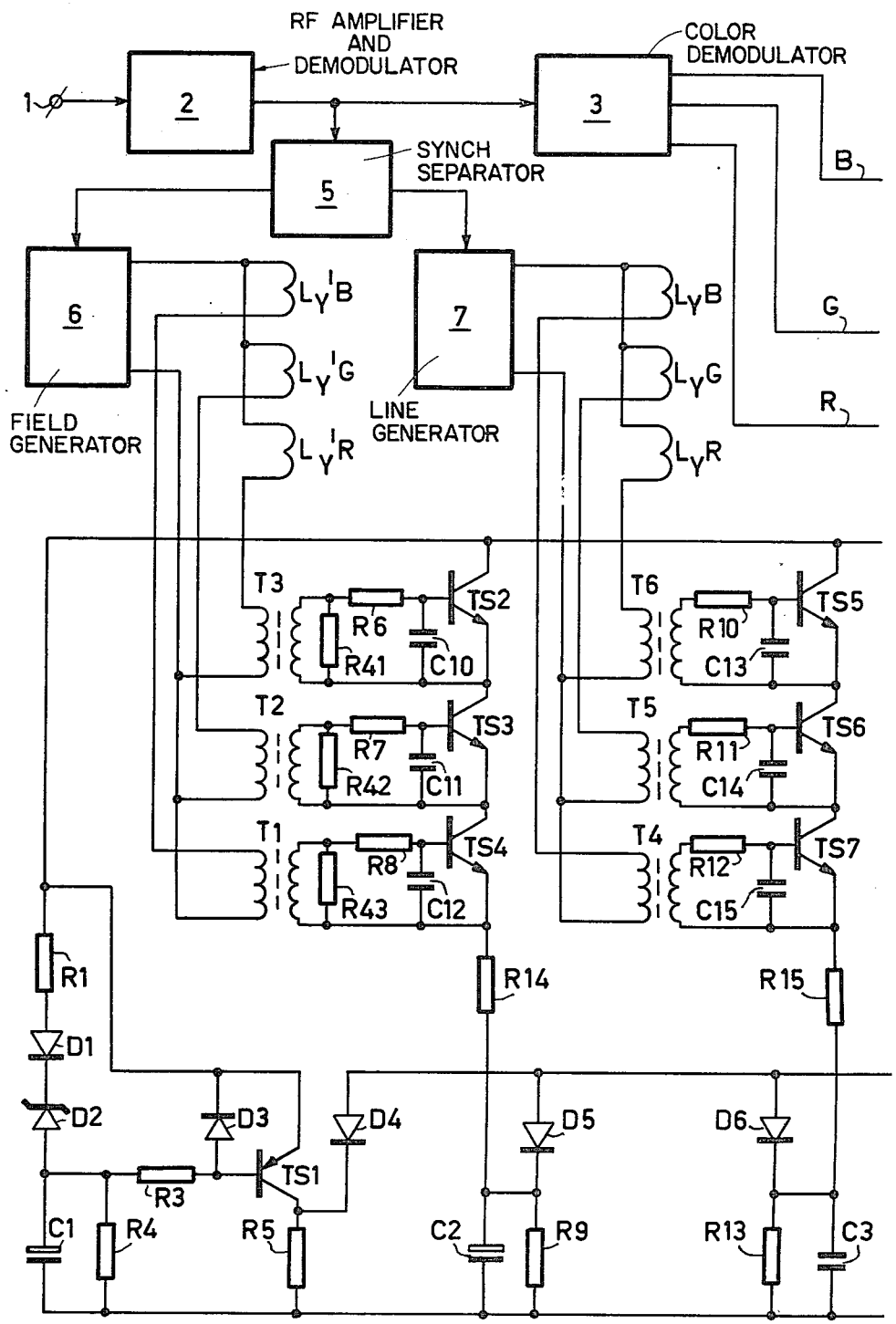
Figure 2:
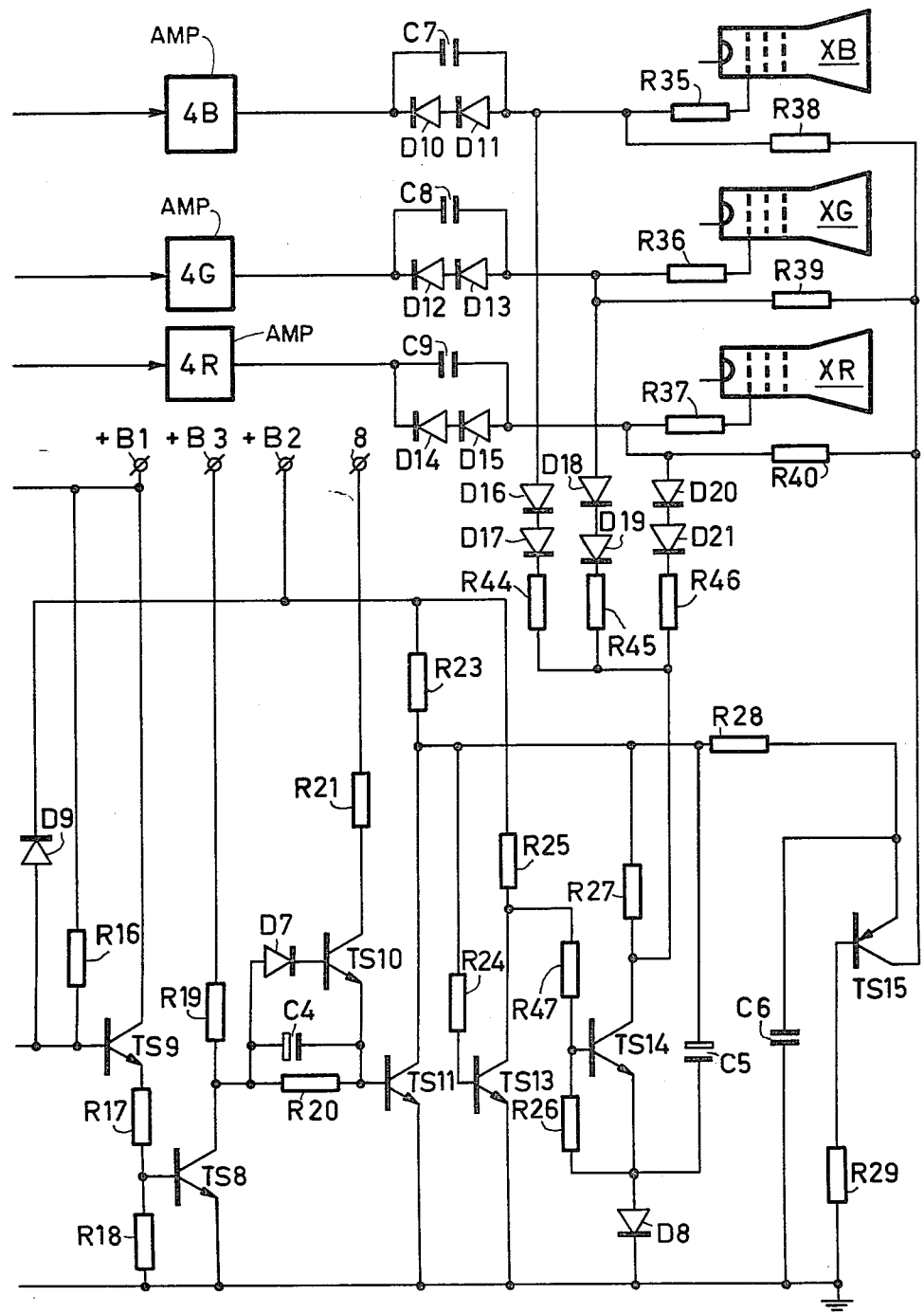

In the drawings where Sheet FIG. 1 should be placed to the left of Sheet FIG. 2 the apparatus is shown to comprise an input terminal 1 for receiving a television composite signal modulated in the normal manner on a carrier. The terminal 1 may be connected to an aerial for receiving a transmitted television signal or may be connected to the output of a video tape-recorder when such recorder produces a television signal modulated on a carrier. The signal at terminal 1 is applied to block 2 which includes r.f. and i.f. amplification and demodulation of the modulated signal. The output of block 2 is applied to a colour demodulator circuit 3 whose outputs supply the three separate colour television signals blue (B), green (G) and red (R), which are respectively applied to amplifiers 4B, 4G and 4R. The output of block 2 is also connected to a synchronization separator stage 5 having two outputs respectively providing field and line synchronizing signals which are respectively applied to a field generator stage 6 and a line generator stage 7. The field generator stage 6 includes a field output circuit to which three field deflection coils $L_{y'}B$, $L_{y'}G$ and $L_{y'}R$ are connected in parallel branches. In a similar manner the line generator stage 7 has a line output circuit to which three line deflection coils $L_yB$, $L_yG$ and $L_yR$ are connected in parallel branches.

There are thus provided field and line deflection coils for deflecting the beams of associated television projection tubes XB, XG and XR in two orthogonal directions.

In series with each field deflection coil there is connected the primary of a transformer such that the primary of transformer T1 is connected in series with field deflection coil L$_y$'B, the primary of transformer T2 is connected in series with field deflection coil L$_y$'G, while the primary of transformer T3 is connected in series with deflection coil L$_y$'R. In a similar manner the primaries of transformers T4, T5 and T6 are respectively connected in series with the line deflection coils L$_y$B, L$_y$G and L$_y$R. These transformers and their associated circuits to be described hereinafter form sensing means.

The rest of the circuitry associated with the protection of the projection tubes is as follows. Between a supply terminal +B1 carrying voltage of 33 V for supplying the low voltage parts of the apparatus and earth are serially connected to resistor R1, diode D1, zener diode D2 and resistor R4, the latter resistor having capacitor C1 in parallel therewith. The junction of zener diode D2 and resistor R4 is connected through a resistor R3 to the base of a pnp transistor TS1, a diode D3 being connected in the manner shown across the base-emitter junction of transistor TS1, the emitter of this transistor and the cathode of diode D3 being connected to the supply terminal +B1. The collector of transistor TS1 is connected through a resistor R5 to earth, the junction of transistor TS1 and resistor R5 being connected to a diode D4 poled in the manner shown to the base of a npn transistor TS9, the base of which is additionally connected through a resistor R16 to the supply terminal +B1.

The secondary of transformer T3 is shunted by a resistor R41 and its upper terminal connected through a resistor R6 to the base of npn transistor TS2 while the lower terminal is connected to the emitter of that transistor, the base-emitter junction of that transistor being shunted by capacitor C10. In a similar manner the secondary of transformer T2 is connected in association with resistors R7 and R42 and capacitor C11 to the base and emitter of npn transistor TS3 while the secondary of transformer T1 is connected with associated resistors R8 and R43 and capacitor C12 to the base and emitter of npn transistor TS4. The emitter-collector paths of transistors TS2, TS3 and TS4 are connected in series as shown with the collector of transistor TS2 being connected to the supply terminal +B1, while the emitter of transistor TS4 is connected through resistors R14 and R9 to earth, capacitor C2 shunting resistor R9. A diode D5 poled in the manner shown is connected between the junction of resistors R9 and R14 of the base of transistor TS9.

The secondary of transformer T6 has its upper terminal connected through a resistor R10 to the base of an npn transistor TS5 while its lower terminal is connected to the emitter of transistor TS5, the base emitter junction of transistor TS5 being shunted by capacitor C13. In a similar manner the secondary of transformer T5 is connected with resistor R11 and capacitor C14 to the base and emitter of npn transistor TS6, while the secondary of transformer T4 is connected with resistor R12 and capacitor C15 to the base and emitter of an npn transformer TS7. The collector-emitter paths of transistors TS5, TS6 and TS7 are connected in series with the collector of transistor TS5 connected to the supply terminal +B1 while the emitter of transistor TS7 is connected through resistors R15 and R13 to earth, resistor R13 being shunted by capacitor C3. A diode D6 poled in the manner shown connects the junction of resistors R13 and R15 to the base of transistor TS9.

The base of the transistor TS9 is additionally connected through a diode D9 poled in the manner shown to a supply terminal +B2 carrying a supply of 225 V used to energize the amplifiers 4B, 4G and 4R.

The collector of transistor TS9 is connected to the supply terminal +B1 while its emitter is connected through resistors R17 and R18 to earth, the junction of these two resistors being connected to the base of npn transistor TS8. The collector of transistor TS8 is connected through a resistor R19 to a supply terminal +B3 carrying a supply of 145 V used to energize the line output circuit of the apparatus this collector also being connected through a diode D7 to the base of npn transistor TS10 and through the parallel arrangement of a capacitor C4 and a resistor R20 to the base of a further npn transistor TS11, the emitter of transistor TS10 also being connected to the base of transistor TS11. The collector of transistor TS10 is connected through a resistor R21 to a terminal 8 whose purpose will be described hereinafter. The emitter of transistor TS11 is directly connected to earth while its collector is connected through a resistor R23 to the supply terminal +B2. The collector of transistor TS11 is also connected through a resistor R24 to the base of npn transistor TS13 whose collector is connected through a resistor R25 to the supply terminal +B2 and whose emitter is connected directly to earth. The collector of transistor TS13 is also connected through a resistor R47 to the base of a further npn transistor TS14 whose collector is connected through a resistor R27 to the collector of transistor TS11. The emitter of transistor TS14 is connected through a diode D8 poled in the manner shown to earth while a resistor R26 is connected in parallel with the base emitter junction of transistor TS14, the emitter also being connected through a capacitor C5 to the collector of transistor TS11. The collector of transistor TS11 is further connected through a resistor R28 to the emitter of pnp transistor TS15 whose base is connected through a resistor R29 to earth while a capacitor C6 is connected between the emitter and earth.

The output of amplifier 4B is connected through two serially connected diodes D10 and D11 poled in the manner shown and shunted by capacitor C11 and connected through resistor R35 to the control grid of the blue projection tube XB. In a similar manner the output of amplifier 4G is connected through diodes D12 and D13 shunted by capacitor C8 and connected by resistor R36 to the control grid of the green projection tube XG. The output of amplifier 4R is similarly connected through diodes D14 and D15 shunted by capacitor C9 and connected by resistor R37 to the control grid of the red projection tube XR,. The collector of transistor TS14 is further connected to three paths each of which is respectively connected to the control grid circuits for each of the projection tubes. The first path comprises a resistor R44 connected through diodes D16, D17 to the junction of diode D11 and resistor R35. The second path comprises a resistor R45 connected through diodes D18, D19 to the junction of diode D13 with resistor R36. The third path comprises a resistor R46 connected through diodes D20, D21 to the junction of diode D15 and resistor R37. The collector of transistor TS15 is also connected to the previously mentioned junctions in the control grid circuits for each of the three projection tubes through resistors R38, R39 and R40 respectively.

In operation, the signal received at the terminal 1 is amplified and converted into an i.f. frequency signal and demodulated in block 2 before being applied to colour demodulator 3. The output of the colour demodulator provides the three colour signals as previously mentioned which are amplified by the respective amplifiers 4B, 4G and 4R. The outputs of the amplifiers are applied under normal circumstances through the appropriate pairs of diodes D10, D11; D12, D13; D14, D15 and asssociated resistors R35, R36 and R37, respectively to the control grid of respective colour tubes XB, XG and XR to provide picture information at the central grids.

The signal received by symchronizing separator 5 is separated to produce field ssynchronizing pulses which are applied to field generator stage 6 and line synchronizing pulses which are applied to line generator stage 7. The three field deflection coils $L_{Y'}B$, $L_{Y'}G$ and $L_{Y'}R$ are connected in parallel to the field output circuit in the field generator stage 6 such that field deflection current passes through each field deflection coil to deflect the beams in the associated projection tubes XB, XG and XR in the field direction. Similarly, the line deflection coils $L_{Y}B$, $L_{Y}G$ and $L_{Y}R$ are connected in parallel in the line output circuit in the line generator stage 7 such that line deflection current passes through each line deflection coil to deflect the beams in the three associated projection tubes in a second direction (line) orthogonal to the field direction. Under these conditions, the relevant deflection currents will be conveyed through the primaries of transformers T1, T2, T3 and T4, T5, T6 to produce voltages on their secondaries as will be described hereinafter.

With the 33 V, present at terminal +B1, transistors TS9 will be conducting due to the bias applied to its base through resistor R16 from the above mentioned terminal. At the same time, transistor TS1 will also be conducting due to the bias applied to its base from the potential divider comprising resistors R1 and R4, diode D1 and zener diode D2. With transistor TS1 fully conducting a voltage of nearly 33 V is present at its collector though this voltage is not applied to the base of transistor TS9 due to diode D4 being reverse biased. The pulse voltages present on the secondaries of the transformers of T1, T2 and T3 after being applied through their associated R.C. networks to the bases of transistors TS4, TS3 and TS2 respectively, are just sufficient to maintain these transistors conducting such that they effectively connect resistors R14 and R9 between terminal +B1 and earth. By virtue of the respective values of these two resistors the voltage at their junction is close to the supply voltage at terminal +B1. In a similar way the pulse voltages present on the secondaries of transformers T4, T5 and T6 after being applied through their associated R.C. networks are just sufficient to maintain transistors TS7, TS6 and TS5 conducting such that resistors R15, R13 are also effectively connected between terminal +B1 and earth. The voltage at the junction of these two resistors by virtue of their respective values is also close to the supply voltage +B1. One of the diodes D5, D6 will be slightly conducting to set the voltage at the base of transistor TS9 in conjunction with resistor R16. In addition, the terminal +B2 is isolated from the base of transistor TS9 due to the voltage at this terminal being higher than that at the base of transistor TS9 through the reverse biased diode D9.

In the above circumstances transistor TS9 conducts to the level determined by the voltage at its base to produce a voltage at the junction of resistors R17, R18 sufficient to cause transistor TS8 to be fully conducting which in turn causes transistors TS10 and TS11 to be non-conducting. The voltage at the collector of transistor TS11 is therefore high enough to cause transistor TS13 to be fully conducting which in turn causes transistor TS14 to be off and for transistor TS15 to be on. By virtue of the connections of the collectors of transistors TS14 and TS15 to the grid circuits of the projection tubes XB, XG, XR, the diodes D10, D11, D12, D13, D14, D15 are conducting so allowing picture information to be applied to the control grid of the respective projection tubes XB, XG, XR, while diodes D16, D17, D18, D19, D20, D21 and all off.

Should a fault occur in any one of the line or field deflection coils the associated transformer sensing the current to that deflection coil will not produce a voltage across its secondary or produce a reduced voltage and thus the associated switching transistor TS2, TS3. TS4, TS5, TS6, TS7 will become non-conducting. This will cause either resistors R14 or R15 to be isolated from the terminal +B1 and the appropriate capacitor C2 or C3 will be rapidly discharged by the resistor R9 or R13 in parallel therewith. This will cause the associated diode D5 or D6 to conduct such as to reduce the voltage at the base of transistor TS9 and hence its conduction such that the voltage at the junction of the resistor R17, R18 is insufficient to maintain transistor TS8 conducting. This will result in the transistors TS11, TS13, TS14 and TS15 to change their state such that transistors TS11 and TS14 wil be conducting while transistors TS13 and TS15 will be non-conducting, transistor TS10 initially remaining in the non-conducting state. Due to the change of state of transistors TS14 and TS15, the diodes D10, D11, D12, D13, D14, D15 will become non-conducting and the diodes D16, D17, D18, D19, D20, D21 will become conducting so preventing picture information being applied to the control grids of the projection tubes XB, XG, XR. If the fault on the appropriate deflection coil does not clear within a few seconds then capacitor C4 will become sufficiently charged for transistor TS10 to become conducting and an output pulse will be produced at terminal 8 which can be used to switch the projection television apparatus into a stand-by condition.

Although as so far described protection is provided when a fault occurs in any one of the deflection coils the apparatus is also protected should one of the supply voltages be heavily reduced or absent. Thus should the 33 V supply at terminal +B1 disappear with capacitor C1 charged transistor TS1 base-emitter junction will be reversed biased to render that transistor non-conducting. Diode D4 will then conduct and quickly reduce the voltage present on the base of transistor TS9. Similarly, if the supply at terminal +B2 should disappear diode D9 would be forward biased also to reduce the voltage present at the base of transistor TS9.

I claim:

1. Projection television apparatus having a plurality of projection television tubes each adapted to produce a display of a different colour for projection, each projection tube having a line deflection coil and a field deflection coil for deflecting an electron beam when generated in each projection tube in two orthogonal directions, the said line deflection coils being connected in parallel branches connected to a line output stage for providing line deflection current through said line deflection coils, the said field deflection coils being connected to a field output stage for providing field deflection current through said field deflection coils, and protection means for protecting a projection tube in the event of the cessation of or substantial reduction in the line deflection current through the line deflection coil corresponding to said projection tube, said projection means comprises sensing means connected in series with each line deflection coil for separately sensing the line deflection current therethrough, and means responsive to said sensing means for preventing the electron beams from falling on the screens of the projection tubes upon the occurrence of the said event.

2. Projection television apparatus as claimed in claim 1, in which said field deflection coils are connected in parallel branches, and wherein said protection means additionally comprises further sensing means connected in series with each field deflection coil for separately sensing the field deflection current therethrough, and means responsive to said further sensing means for preventing the electron beam from falling on on the screen of the projection tubes in the event of the cessation of or a substantial reduction in the field deflection current through the field deflection coil corresponding to one projection tube.

3. Projection television apparatus as claimed in claim 1, comprising a control stage and wherein said sensing means comprises a plurality of transformers the primary of each transformer being connected in series with a corresponding line deflection coil while the secondary is connected to an associated transistor such that the associated transistor conducts in the presence of a normal line deflection current but is non-conducting in the even of the cessation of or substantial reduction in the line deflection current through the corresponding line deflection coil, said transistor being connected to said control stage such that in the event of one of said transistors being non-conducting said control stage prevents picture information from being applied to the control grids of the projection tubes.

4. Projection television apparatus as claimed in claim 1 or 2 wherein said further sensing means comprises a plurality of further transformers the primary of each further transformer being connected in series with a corresponding field deflection coil while the secondary is connected to an associated further transistor such that the associated transistor conducts in the presence of a normal field deflection current but is non-conducting in the event of the cessation of or substantial reduction in the field deflection current through the corresponding field deflection coil, said further transistors being connected with said control stage such that in the event of one of said further transistors being non-conducting said control stage prevents picture information from being applied to the control grids of the projection tubes.

* * * * *